(12) United States Patent
Colella

(10) Patent No.: US 7,853,535 B2
(45) Date of Patent: Dec. 14, 2010

(54) SYSTEM FOR SECURE INTERNET ACCESS FOR CHILDREN

(76) Inventor: Brian A. Colella, P.O. Box 863, Shady Side, MD (US) 20764

( * ) Notice: Subject to any disclaimer, the term of this patent is extended or adjusted under 35 U.S.C. 154(b) by 55 days.

(21) Appl. No.: 12/218,986

(22) Filed: Jul. 17, 2008

(65) Prior Publication Data

US 2009/0064302 A1 Mar. 5, 2009

Related U.S. Application Data

(63) Continuation-in-part of application No. 11/646,121, filed on Dec. 27, 2006, and a continuation-in-part of application No. 11/715,543, filed on Mar. 8, 2007.

(51) Int. Cl.
*G06Q 20/00* (2006.01)
*G06K 5/00* (2006.01)
(52) U.S. Cl. .......................... 705/67; 235/380
(58) Field of Classification Search .................... 705/50
See application file for complete search history.

(56) References Cited

U.S. PATENT DOCUMENTS 5,764,789 A * 6/1998 Pare et al. .................... 382/115
6,137,409 A * 10/2000 Stephens .................. 340/568.1
6,334,118 B1 * 12/2001 Benson ......................... 705/52
6,484,260 B1 * 11/2002 Scott et al. ................... 713/186
2004/0050930 A1 * 3/2004 Rowe .......................... 235/380
2004/0123113 A1 * 6/2004 Mathiassen et al. .......... 713/185
2007/0131759 A1 * 6/2007 Cox et al. .................... 235/380
2008/0250485 A1 * 10/2008 Schreyer et al. ................ 726/9

* cited by examiner

*Primary Examiner*—Calvin L Hewitt, II
*Assistant Examiner*—Zeshan Qayyum
(74) *Attorney, Agent, or Firm*—Ober, Kaler, Grimes & Shriver; Royal W. Craig

(57) ABSTRACT

A system and method for secure internet access by children that assigns each child a Safe Card with integral fingerprint scanner, plus an intelligent USB card reader for biometric-secure internet access. Both the Safe Card and card reader/docking station have device ID numbers. At registration each child is assigned a user ID, and a registration record is compiled including user ID, device IDs and photo data. Parents author a parental ruleset for their child which is associated with the registration record. The child activates their Safe Card by an initial fingerprint scan, and can then access the Internet from any web-enabled computer simply by plugging the card reader/docking station into the computer's USB port, inserting their Safe Card, and scanning their fingerprint. This authenticates the child, pre-loads the parental control ruleset and gives the child-user a restricted safe and secure but full internet experience.

1 Claim, 4 Drawing Sheets

SYSTEM FOR SECURE INTERNET ACCESS FOR CHILDREN

CROSS-REFERENCE TO RELATED APPLICATION(S)

The present application is a continuation-in-part of U.S. application Ser. No. 11/646,121 filed 27 Dec. 2006, and a continuation-in-part of U.S. application Ser. No. 11/715,543 filed Mar. 8, 2007.

BACKGROUND OF THE INVENTION

1. Field of the Invention

The present invention relates to secure internet access for children based on prerequisite personal identification and authentication and, more particularly, to a system for biometric-secure internet access for children that is restricted by custom safe kid's site controls with live online traffic monitoring and parental controls that limit access as needed to protect children online and provide parents with peace of mind.

2. Description of the Background

Today children have a world of information at their fingertips. Through the Internet they can explore the ocean, learn of different cultures, and access media with a freedom unthinkable twenty years ago. Unfortunately, the internet is fraught with risk for children, including predatory emails, chat room solicitations and unsavory websites. Parents are becoming finely attuned to the risks involved and are clamoring for more parental controls to insure child Internet safety.

Unfortunately, the challenges of monitoring and controlling Internet access for children become more difficult each day because the solicitors and predators are getting smarter. Cyber laws and content filters have only limited effectiveness. Parents need more control and full time online monitoring to make sure their children are protected from harmful content and to avoid the sexual predators out in cyberspace.

Some of the major online providers are beginning to take the situation more seriously. For example, America Online™ distributes Internet Access Controls (IAC) 3.0, which provides the following features:

Screen Name List Management—Parents can manage a list of users that can access the Internet from a specific computer.

Content management: based on their assigned screen name children are granted limited age-appropriate online access.

Filters: any unauthorized programs that try to gain access to the computer are blocked.

The foregoing features give parents the flexibility to decide which types of Web sites are appropriate for their child's age and maturity. Unfortunately, various users have reported that it is possible to defeat AOL's Parental Controls either from the outside or by a child intent on free browsing. For example, AOL's Parental Controls permit a "Guest" logon so that visitors to a home can logon using their account privileges. Many instances have been reported of children getting their hands on guest or parent's screen names and passwords, which gives them the same access privileges. Screen name swapping is quite common and impossible for AOL to detect unless there are simultaneous logons with the same screen name.

It would be greatly advantageous to provide an online parental control system and full time online monitoring that is not screen name and password dependent, but instead relies on localized encrypted biometric authentication of a child's fingerprint data. This would eliminate hijacking of screen names and result in a most secure and safe network for children to use the internet.

Biometric authentication is gaining popularity as a security measure, and especially fingerprints. For example, U.S. Pat. No. 6,950,810 to Lapsley et al. (Indivos Corporation) issued Sep. 27, 2005 shows a tokenless biometric electronic financial transactions method for authorization of an electronic payment between a payor and a payee using a third party provider.

United States Patent Application 20040199469 by Barillova et al. published Oct. 7, 2004 shows a method and system for authentication of online commercial transactions between a customer and a merchant comprising the steps of registering a customer with a PIN and a biometric sample, and a customer financial account. A temporary transaction code is issued to each authenticated customer; and conducting a transaction with a merchant using said temporary transaction code.

U.S. Pat. No. 5,613,012 to Hoffman et al. (Smarttouch, LLC) issued Mar. 18, 1997, and related U.S. Pat. No. 6,269,348 to Pare, Jr. et al. (Veristar Corporation) issued Jul. 31, 2001 both show a tokenless identification system and method for authorization of transactions and transmissions. The system uses a comparison of a fingerprint gathered directly from an unknown user, with an authenticated biometrics sample of the same type obtained and stored previously.

U.S. Pat. No. 6,270,011 to Gottfried issued Aug. 7, 2001 shows a method for providing secure transactions with credit cards by adding a fingerprint scanner at the point-of-sale to obtain fingerprint data, so that a credit card company database can verify the fingerprint data against stored fingerprint information and verify the transaction accordingly. The method is integrated into the existing negotiation protocol between a point-of-sale system and a credit card company database, and uses a human fingerprint and a secure algorithm. The credit card company has the customer fingerprint for comparison on its existing database. In the case of an Internet purchase, an authorization adaptor is connected to the user PC, and once the user has made the purchase request, an encrypted communication is then commenced in which a token is sent by the credit card company to the user PC, requesting fingerprint data. The authorization adaptor provides the fingerprint scan, and sends the data to the user PC in encrypted form, for transfer to the credit card company by a secure communication, for authorization. The fingerprint scanner is based on use of a new sensor employing a technology that maps and matches fingerprints, using coincidence of the features (minutia) on as few as twelve similar points, to determine a match.

United States Patent Application 20050165700 by Karthik (Multimedia Glory) published Jul. 28, 2005 shows a security system for electronic commerce for verifying the authenticity of a user including: a server authentication program installed in a web-server at a website of a web-service provider; a client software component and fingerprint scanner installed at a workstation of the user. The scanner takes and converts a biometrics image into digital data, which is then compressed and encrypted, and transmitted to the web-server.

U.S. Pat. No. 6,944,773 to Abrahams issued Sep. 13, 2005 shows a method of on-line authentication in which a user presents one or more fingerprints for authentication during an on-line transaction, such as an Internet transaction. The host system indicates how many fingerprints will be requested for authentication, randomly selects which fingerprints will be requested, and sends a request for entry of the randomly selected fingerprints, and then compares the received fingerprint data to fingerprint data stored in a database.

U.S. Pat. No. 6,241,288 issued to Bergenek et al. in 2001 shows a fingerprint identification/verification algorithm that uses bitmaps of a stored fingerprint to correlate with a bit map of an input fingerprint, wherein an accurate reference point is located. This is followed by the selection of several two-dimensional areas in the vicinity of the reference point of the input image of the fingerprint. These areas are then correlated with stored fingerprint recognition information to determine if the input fingerprint image and the stored fingerprint recognition information are sufficiently similar to identify/verify the input fingerprint.

U.S. Pat. No. 4,229,023 to Luz issued Oct. 21, 1980 shows an identity check card with a fingerprint cut away in spots to provide alternate transparent zones and partial fingerprint zones. The placement of the card over a fresh fingerprint show immediately if the latter complements the former, thus permitting a quick and reliable check to be effected.

U.S. Pat. No. 5,869,822 to Meadows et al. issued Feb. 9, 1999 shows an automated fingerprint identification system. When a person applies for a credit card they must register a finger of their choice with the card issuance company. At the company, the finger is scanned and a composite number is produced that consists of several fingerprint-identifying parameters. The composite number is encoded onto the card and is stored in a card database. When a person wants to use the card, the card is inserted into a card reader and the person's finger is scanned by a fingerprint scanner, which produces a composite number. The immediate and stored composite numbers are compared and, when similar, use of the card is allowed.

United States Patent Application 20040044621 by Huang et al. (VISA) published Mar. 4, 2004 shows a payment system for facilitating a payment transaction between a payer and a payee using a separate payer access device, payee access device, and a services hub.

AuthenTec Inc. has announced the TruePrint™ fingerprint reader with incorporated Bluetooth transmitter. AuthenTec's press releases claim the company has 17 pending patents, but does not state the countries in which they are pending.

Internet Commerce Account Status Information (ICASI) sells a third party service that requires a biometric finger-scan to authorize use of a business bank account, credit card transaction, or online commerce. Once users have registered their fingerprints, they can conduct business with thousands of participating merchants.

The TouchPass log-on security solution by NEC Technologies, Inc. offers finger-imaging technology to authenticate an individual's identity.

DigitalPersona, Inc. provides a complete fingerprint security system for PCs using USB fingerprint sensors. The plug-and-play USB fingerprint sensor is self-calibrating, and features auto and optimal image capture, latent image removal, a challenge-response link, and encrypted transmission of biometric information.

While the foregoing references all teach improved security through fingerprint biometrics, none makes it user-friendly enough for use by children without exposing any authentication information of the child to possible hijack, nor do they integrate the biometrics with a robust parental control system.

SUMMARY OF THE INVENTION

Accordingly, it is an object of the present invention to provide a secure identification device for children that can only be used and accessed by the individual owner of the device via biometric security, while also ensuring complete privacy of the child's biometric and personal data.

It is another object to provide a convenient method for biometric-secure internet access for children, as well as restricted access authentication, to provide parents with a high-confidence that their child's internet access is restricted in accordance with custom safe kid's site controls with live online traffic monitoring and custom parental controls.

It is another object to provide a convenient method for parents, guardians or supported educational institutions to implement restricted access compliance to their computers and systems while providing individual required authentication for system use.

According to the present invention, the above-described and other objects are accomplished by providing a method, system architecture, and peripheral components inclusive of a Safe Card Scanner with integral fingerprint scanner, and a Caddy-Pilot (intelligent card reader and docking device) inot which the Safe Card Scanner docks for facilitating method for biometric-secure internet access for children. The system is sponsored by a 3rd party sponsoring application service provider that hosts a provider network, and which initially distributes both the safe card scanner and caddy-pilot to users through participating schools and other supporting learning institutions (who serve as registration agents for the sponsor). Children register at their participating schools or other supporting learning institutions where a registration agent signs them up for the service, and enrolls their own Safe Card Scanner or optional, Caddy-Pilot. Both the Safe Card Scanner and Caddy-Pilot have internal memory, and device ID numbers stored therein. At registration each child is assigned a user ID, corresponding with the SAFE Card Scanners ID #, and the registration agent compiles a user record including the assigned user ID plus the Safe Card Scanner ID numbers. This record is encrypted and forwarded to the ASP network for later authentication/comparison.

Next, still at sign-up, the child activates their Safe Card scanner by an initial scan of the child's fingerprints, and a portion of the digitized fingerprints scanned are stored locally on the Safe Card scanner (along with the assigned device and child's ID number). The activating agent also attaches a photo ID of the child user to the Safe Card scanner, and another to Caddy-Pilot for Kids 4.

Given a registered and activated Safe Card scanner, the child can access the internet from any web-enabled computer simply by plugging the Caddy-Pilot for Kids into the computer USB port and inserting the SAFE Card Scanner into it. The Caddy-Pilot for Kids automatically opens a browser program and loads the URL of the sponsoring ASP's secure site, for example, www.KidsNITCH.com. After inserting the SAFE Card Scanner into the Caddy Pilot for Kids, it automatically initiates a scan of their fingerprint, which instantaneously captures a portion of their fingerprint minutia and compares it to the minutia stored previously at activation, thereby authenticating that child as the authorized user of that Safe Card Scanner.

Once a local authentication has taken place the Safe Card scanner sends an encrypted packet of information through the ASP network 30 comprising the assigned user ID plus the Safe Card Scanner and Caddy-Pilot for Kids ID numbers. This data is compared with the registration record stored by the ASP 30 to fully authenticate the child user, and to pre-load a corresponding parental control ruleset.

A proper authentication is displayed on the LCD screen for security. Given proper authentication the ASP network provides the child-users with a restricted and yet full internet experience including online shopping malls, Chat Rooms, Libraries, internet search engines, etc. The child's authentication may, if desired, be refreshed periodically (for example, every 30 minutes) by another fingerprint scan to reduce unauthorized use.

The sponsoring ASP maintains a database of approved URLs, and additionally provides the child-users the ability to input a URL that does not already exists in the online database in order to initiate a real-time content sweep. In milliseconds any designated site can be swept for content, and approved or disapproved for access by the child. This sweep capability may check an entire website for inappropriate language, phases, links to other URL's, pictorial content, etc. This sponsoring ASP also monitors the child's usage and can activate its own content sweep accordingly. For example, if the child inputs a URL address into one of the network search engines, a content sweep may be automatically initiated resulting in approval or disapproval. Any issued approval is verified and saved in an associated "safe site" database on the sponsoring ASP's network database, thereby facilitating immediate access to the user of any verified and approved site. Sites may be authorized for only partial access if for only those sections of an entire website that are suitable for children.

BRIEF DESCRIPTION OF THE DRAWINGS

Other objects, features, and advantages of the present invention will become more apparent from the following detailed description of the preferred embodiment and certain modifications thereof when taken together with the accompanying drawings in which.

DETAILED DESCRIPTION OF THE PREFERRED EMBODIMENTS

The present invention is a system, inclusive of method, system architecture, and peripheral components inclusive of a card scanner and intelligent card reader for facilitating method for biometric-secure internet access for children, to provide parents with a high-confidence that their child's internet access is restricted in accordance with custom safe kid's site controls with live online traffic monitoring and custom parental controls.

Figure 1:
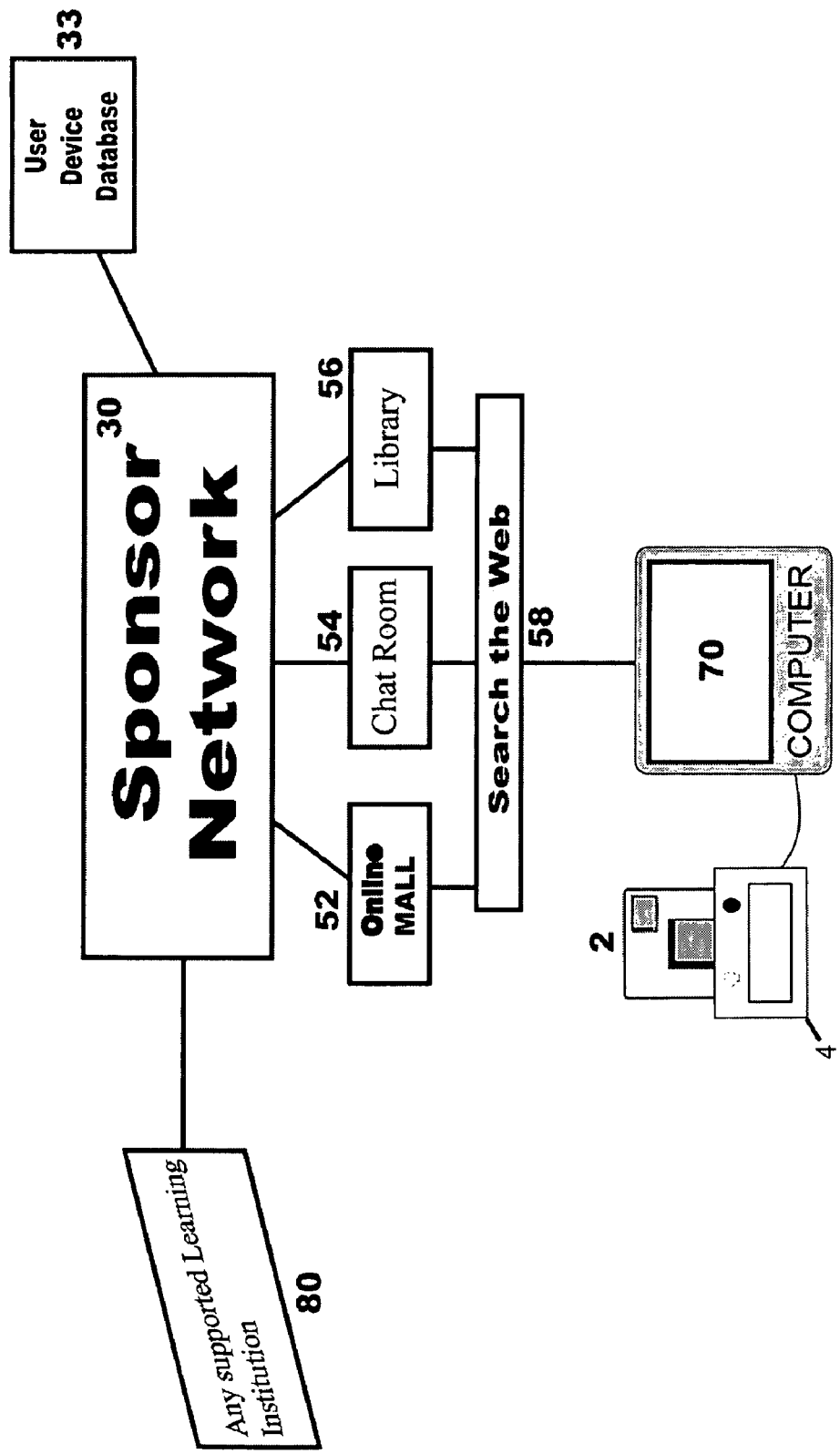
FIG. 1 is a block diagram illustrating a preferred system architecture for biometric-secure internet access for children age 17 and under, subject to custom parental controls in accordance with the present invention.

FIG. 1 is a block diagram illustrating a preferred system architecture for biometric-secure internet access for children age 17 and under, subject to custom safe kids site controls in accordance with the present invention. The system is sponsored by a 3rd party sponsoring application service provider (ASP) 30. The sponsor 30 maintains a service provider network and distributes two separate "SiiDs" (Secure individual identity Devices) to users through participating schools and other supporting learning institutions 80 (the latter essentially serving as a registration agent for the sponsor 30). Specifically, the registration agent 80 distributes fingerprint card scanners ("Safe Card Scanners") 2 and Caddy-Pilots for Kids 4 to users. The Safe Card 2 becomes the child's personal identification device and the Caddy-Pilot for Kids 4 is an intelligent docking station that becomes their online assistant, or "surfing buddy". Both devices 2, 4 help keep the child safe while using the Internet.

In general overview, a child registers with the sponsor 30 by going to any registration agent 80 and signing up for the service, similar to enrolling in school for the first time. Personal information is collected, verified, and stored securely by the registration agent 80, who then gives each child their own Safe Card Scanners and or optional Caddy-Pilot for Kids 4. Both the Safe Card Scanner 2 and Caddy-Pilot for Kids 4 have internal memory, and device ID numbers for each are stored in the internal memory. At registration the child is assigned a user ID, and the registration agent 80 compiles a user record including the assigned user ID plus the Safe Card Scanner 4 ID number and Caddy-Pilot for Kids 4 ID number. This record is encrypted and forwarded through the ASP network 30 for storage in the User Device database 33 and later authentication/comparison.

At sign-up the child must activate their Safe Card scanner 2. Activation entails an initial scan of the child's fingerprints (minimum or two different fingers). The fingerprint images are digitized and a portion of the digitized fingerprint scan is stored locally on the Safe Card scanner 2 only, (along with the assigned Safe Card ID number). The stored portion of the digitized fingerprint scan comprises a subset of the minutia of the scan. The activating agent 80 will also attach a photo ID of the child user to the Safe Card scanner 2, and digitally load another to Caddy-Pilot for Kids 4 for additional security.

Given a registered and activated Safe Card scanner 2, as shown in the bottom section of FIG. 1, child-users may access the internet from any web-enabled computer 70. To do this they must plug the Caddy Pilot for Kids 4 into the computer 70 USB port. The Caddy Pilot for Kids 4 automatically opens a browser program, and restricts internet access by loading the URL of the sponsor 30 safe site. The sponsor 30 safe site automatically opens when a child inserts their Safe Card scanner 2 into their Caddy Pilot for Kids 4, and places their finger on their Safe Card scanner 2 to verify their identity. This automatically initiates a scan of their fingerprint, and the Safe Card scanner 2 instantaneously captures a portion of their fingerprint minutia and authenticates that child as the authorized user of that Safe Card Scanner 2 by comparison of the live scan minutia to the minutia stored locally in Safe Card Scanner 2 at activation.

Once a local authentication has taken place the Safe Card scanner 2 sends an encrypted packet of information through the ASP network 30 comprising the assigned user ID plus the Safe Card Scanner 4 ID number and Caddy-Pilot 4 ID number. This data is compared with the registration record stored in User Device Database 33 to fully authenticate the child user, and to load a predefined parental control ruleset (to be described).

Given proper authentication the Sponsor Network 30 provides the child-users with a restricted safe site for a full internet experience including an online shopping mall (for viewing only) 52 (which has a wish list link to the child's parent or guardian), Chat Room 54, Library 56, and other pre-approved internet sites. All of these web portals 52-58 are preferably accessible to the child user age group through the central website maintained by the sponsor 30. This architecture makes the web 'safer' for the child since all accessible sites are fully approved. It is important to remember that the Safe Card scanner 2/Caddy Pilots for Kids 4 are only issued to children 17 and under. This way, if a child is chatting with another child, a parent can be certain that it is another child.

Again, if desired the child's authentication may need to be refreshed periodically (for example, every 30 minutes) by another fingerprint scan to reduce unauthorized use.

Figure 2:
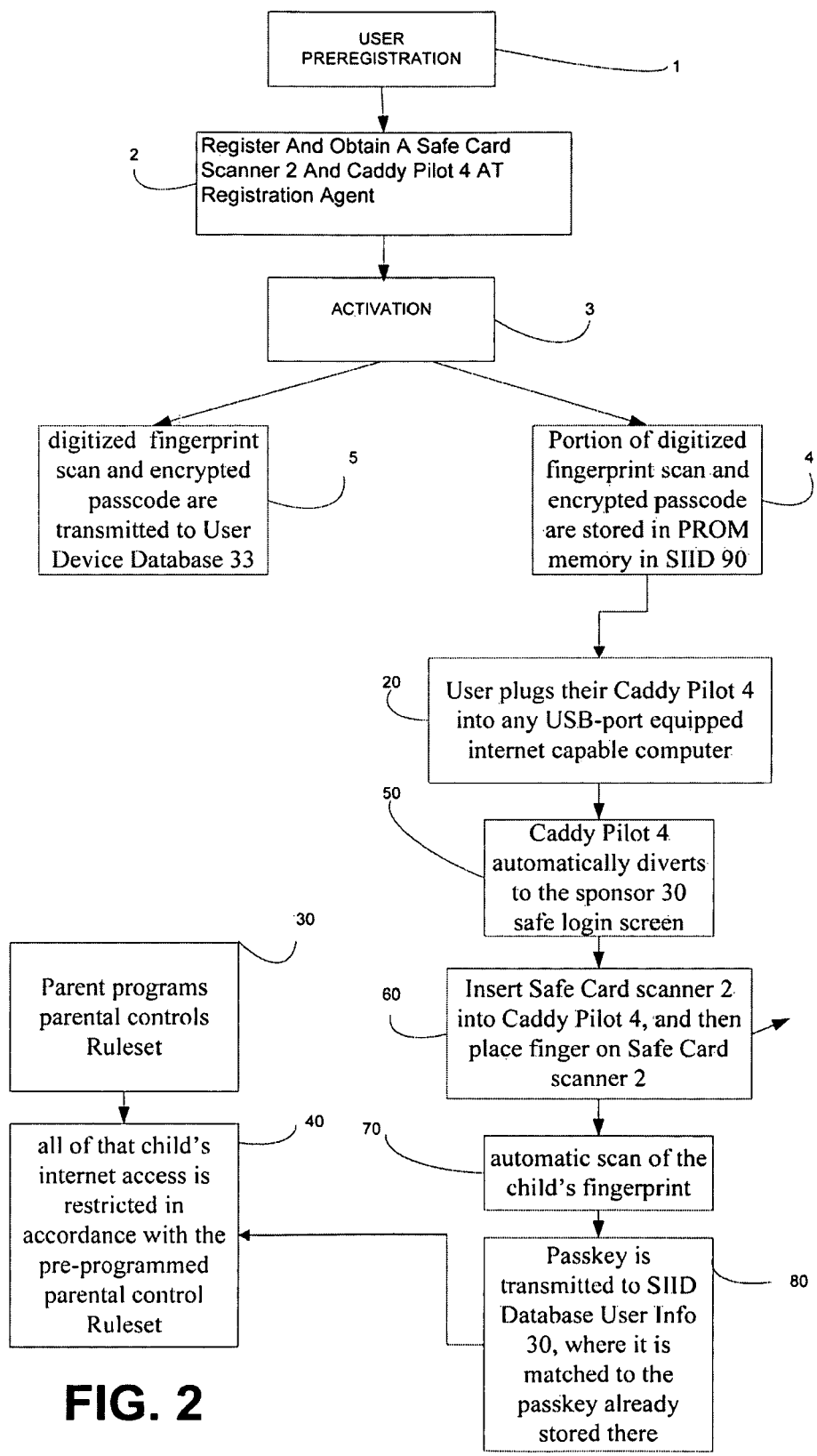
FIG. 2 is a top level flow diagram illustrating the method steps of the present invention.

FIG. 2 is a top level flow diagram illustrating the method steps of the present invention, which will now be described in detail with regard to FIG. 1.

At step 1 (FIG. 2) a child user must first register for the sponsor 30 service through participating schools and supported institutions 80. This is accomplished physically at any participating school or supported institution 80 which essentially serves as a registration agent for the sponsor service. At registration, each child user obtains a Safe Card scanner 2 and a Caddy-Pilot for Kids 4 (at step 2), and provides their bibliographic information. The registration agent 80 compiles a user record including a newly-assigned user ID. Both the Safe Card Scanner 2 and Caddy-Pilot for Kids 4 are pre-assigned device ID numbers which are stored locally on the respective devices. The registration agent 80 adds the device IDs to the user record, and transmits the record (encrypted) to the ASP network 30 for storage in the User Device database 33.

The Safe Card scanner 2 and a Caddy-Pilot for Kids 4 are useless until activated, and so at step 3 the child user activates their Safe Card scanner 2 and a Caddy-Pilot for Kids 4. Activation of the Safe Card scanner 2 entails scanning two initial fingerprints and up to four additional fingers for a device full enrollment. The fingerprint image is digitized and a portion of the digitized fingerprint scan is stored locally on the Safe Card scanner 2 along with the assigned card/user number of the Safe Card scanner 2 for later comparison. The stored portion of the digitized fingerprint scan comprises a subset of the minutia derived from the scan. The minutia are derived from the ridges and furrows of the skin in 3D, and is typically located where ridge endings or bifurcations are found. There are various existing open source algorithms for accomplishing this. Approximately a minimum of 30 points of minutia per finger enrolled are preferred as this results in a small PROM memory requirement of a minimum of 64 kbytes.

The registration agent 80 will digitally photograph and print a photo ID of the enrolled user on the card scanner 2 for security and similarly digitally load the same photo ID of the enrolled user on the Caddy Pilot for Kids 4.

Once registered and activated, the user is free to partake in biometric-secure internet access subject to custom Safe Kid's Site and pre-programmed parental controls.

At step 20, the child user plugs their Caddy Pilot for Kids 4 into any USB-port equipped internet capable computer. Once inserted, at step 50 the Caddy Pilot for Kids 4 automatically opens a browser program (such as Microsoft Internet Explorer™).

At step 60 the child inserts their Safe Card scanner 2 into their Caddy-Pilot for Kids 4, which then requires them to place their finger on their Safe Card scanner 2 to verify their identity.

At step 70 the finger placement automatically initiates a scan of the child's fingerprint, and the Safe Card scanner 2 instantaneously captures a portion of their fingerprint minutia and authenticates it locally with the fingerprint data stored in the Safe Card Scanner 2. The card scanner 2 indicates a match or not by front-mounted LEDs, and assuming a match proceeds to step 80.

At step 80, given local biometric authentication, the Safe Card Scanner 2 issues a packet consisting of an encrypted header, device ID number, and a challenge to the sponsor network 30. The Caddy-Pilot for Kids 4 appends its own ID number to the packet, and then encrypts the packet and forwards it to the sponsor ASP network 30. The ASP 30 decrypts the packet and compares the device or devices ID numbers to those registered to that user (as stored in the User Device Database 33). In this manner it is confirmed that the child is the authorized user of that Safe Card Scanner 2 and Caddy-Pilot for Kids 4. A match of the device ID numbers (combined with the biometric authentication needed to send the ID numbers to begin with) soundly proves the identity of the user without exposing any personal information. Once authenticated, the user can access the internet pursuant to custom Safe Kid's Site and pre-programmed parental controls.

Looking back at step 30, parents may access the sponsor 30 website via a singular parental URL, and are presented with a home page. A login button on the home page allows parents (as well as the ASP Manager) to access login screens prompting for a login ID via SiiD or user name and password. Each successful login is assigned prescribed rights. Parents are assigned limited rights and access to their own User Profile inclusive of a parental control Ruleset for their child's internet access.

As shown at step 40, once a Ruleset has been defined, all of that child's internet access will be restricted in accordance with the ASP 30 Safe Kid's Site ruleset and the pre-programmed parental controls Ruleset.

As described above, the sponsoring ASP 30 maintains a database of approved URLs that have been pre-screened by the ASP's content filters. The ASP 30 maintains a database of child-safe sites, and additionally provides the child-users the ability to input a URL that does not already exists in the online database in order to initiate a real-time content sweep. In milliseconds any designated site can be swept for content, and approved or disapproved for access by the child. This sweep capability may check an entire website for inappropriate language, phases, links to other URL's, pictorial content, etc. This sponsoring ASP also monitors the child's usage and can activate its own content sweep accordingly. For example, if the child inputs a URL address into one of the network search engines, a content sweep may be automatically initiated resulting in approval or disapproval. Any issued approval is verified and saved in an associated "safe site" database on the sponsoring ASP's network database, thereby facilitating immediate access to the user of any verified and approved site. Sites may be authorized for only partial access if for only those sections of an entire website that are suitable for children. The ASP 30 ruleset comprises a set of default rules allowing access to pre-approved databases or portions thereof, and preventing access to sites that are not child-safe sites The Parental Ruleset generally comprises a list of global rules and specific rules, the global rules being as follows:

a) All Safe Kid's Site pre-approved age group website URLs may be allowed by default, and older age group specific websites may be blocked; or b) All website URLs requested by child user must run through the ASP 30 Safe Kid's Site Sweep (SKSS) which scans specific website URL's for appropriate content that may be allowed; and or if not approved by SKSS denied; or c) All times of day, days of week, etc., are by default designated as being permissible for internet access, with specific times designated as blocked; or d) All times of day, days of week, etc., are defaulted as being impermissible, and specific times are designated as allowed.

Given the global rules, the parent can at their discretion build a list of individual URLs which will be blocked or allowed depending on their choice in a & b above, or can build a calendar of time periods and days, which will be blocked or allowed depending on their choice in c & d above. Thus, for example, a father may approve internet access for his daughter only during non-school hours and during the weekends.

Figure 3:
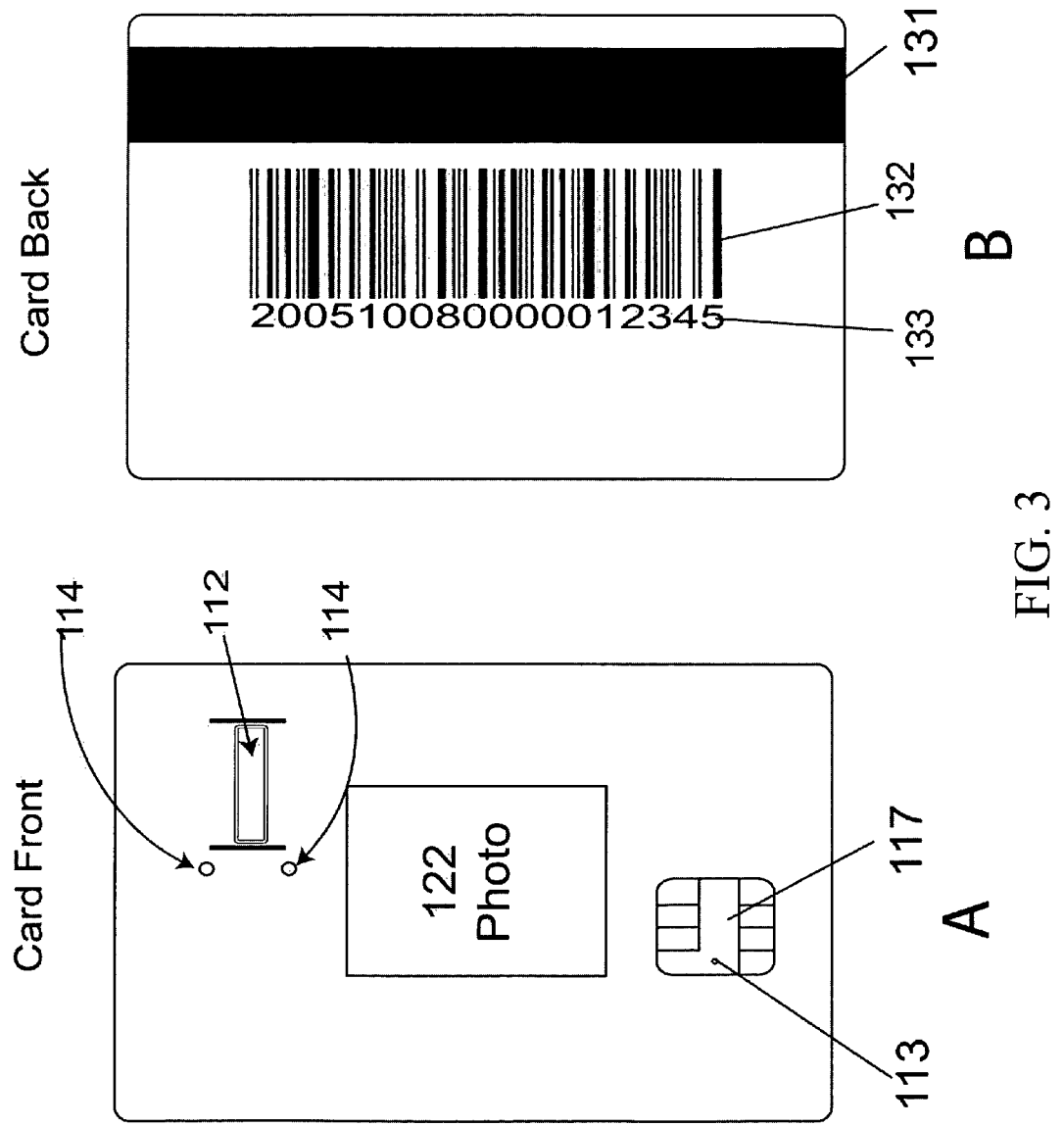
FIG. 3 illustrates the fingerprint Safe Card scanner 2 (front and back views at A, B, respectively) according to the present invention.

FIG. 3 illustrates the fingerprint Safe Card scanner 2 (front and back views at A, B, respectively) according to the present invention. The Safe Card scanner 2 generally comprises a small plastic credit-card sized housing exposing a holographic fingerprint scanning bed 112, and LED's indicators 114 (A & B) for indicating "power on", and for indicating each fingerprint scan result "match" or "no match", respectively, plus a photo 122 for photo ID security. The Safe Card biometric sensor 112 employs a third generation capacitive array sensor chip that detects and captures small variations in the finger surface capacitance and creates a three-dimensional electrical image of the fingerprint's unique pattern. The card is activated by a subset of "minutia" that is stored locally on the device itself. The unique features of the image are extracted to form its own encrypted template which is then stored into protected memory in the module. This entire operation is completed on the device 2. Upon completion of the initial registration process, the module is "locked" and subsequent placement of any enrolled finger on the sensor triggers the verification process. This involves comparing the previously stored "registered" data with the current finger. With the SAFE Card 2 authentication and a resulting match, the person holding the card is verified as its original enrolled authorized user without the use of any external sensors, algorithms, template matches or database access. In support of this, the SAFE Card scanner 2 encloses a processor for controlling the scanning operation and transferring data via communication strip 117 and or infrared, plus an amount of PROM memory for storing the activation information, and a power/communication strip 117. Preferably 64 kb of PROM memory are used for fingerprint minutia processing (approximately 500 points) accounting for about half this space. The power strip 117 is preferably a passive connector for deriving power from an external source upon contact with a mating connector in the reader. A variety of gold-plated swipe-type contacts are commercially available, or power strip 117 may be a contact-less coil.

The flipside of the card 2 (at B) includes a magnetic strip 131 for multiple readers. It is envisioned that the full length magnetic stripe contains a financial account. It is also envisioned that the 131 strip or the Safe Card scanner 2 PROM memory can hold emergency medical info and ID info.

In addition, the Safe Card scanner 2 includes a bar code 132 encoded with the card serial number 133 and card ID number. There are no visible account numbers on the card. Again, this Safe Card scanner 2 becomes one half of the user's personal key for accessing the internet, the Caddy Pilot for Kids 4 or other Safe Card acceptable readers being the other half.

Figure 4:
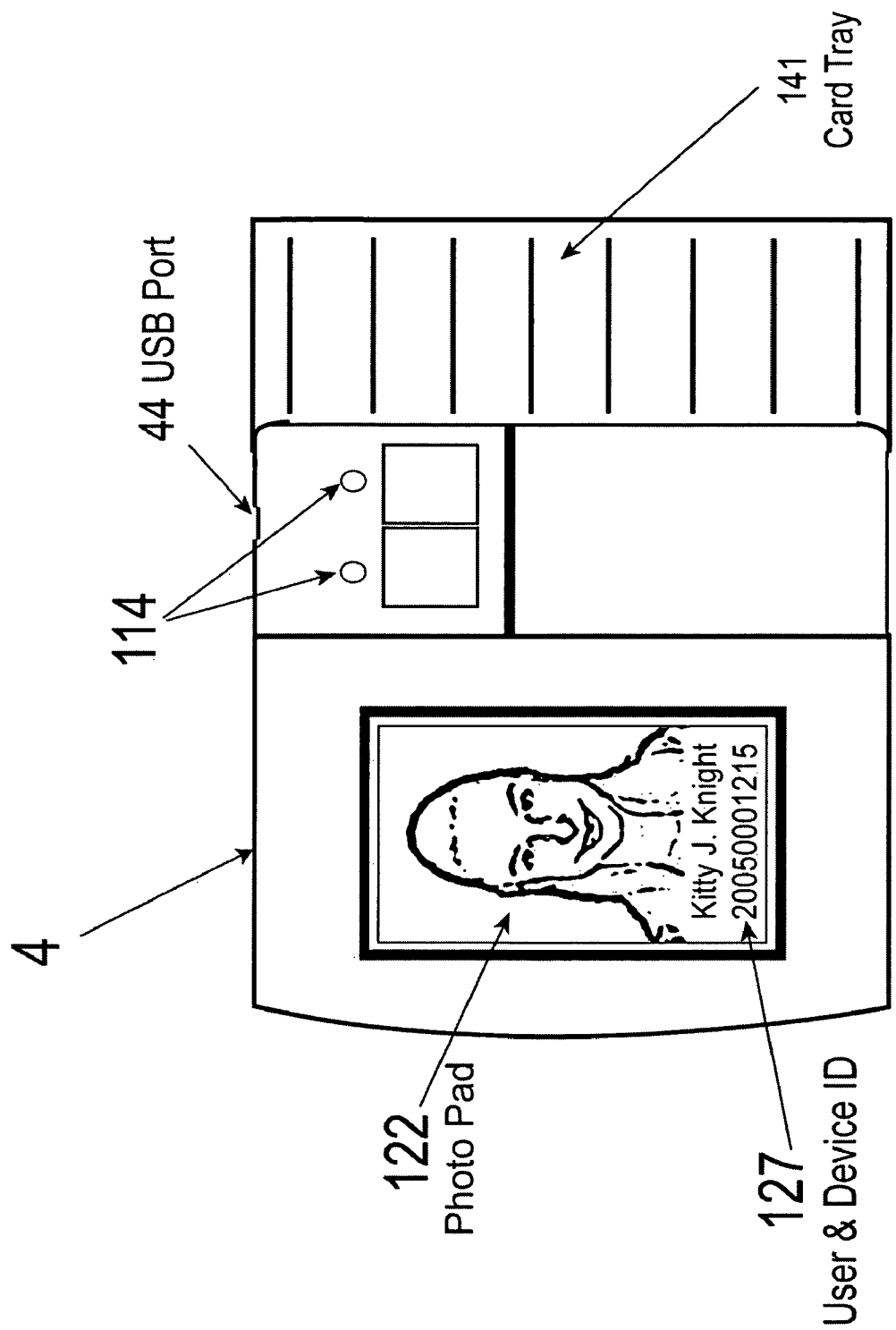
FIG. 4 illustrates the Caddy-Pilot for Kids 4 according to the present invention.

FIG. 4 illustrates the Caddy-Pilot for Kids 4. The Caddy-Pilot for Kids 4 is a card authentication docking station for the Safe Card scanner 2 that provides a secure link to the internet through the ASP Network 30. The Caddy-Pilot for Kids 4 is formed with a plastic housing having a docking bay for slidable insertion of the Safe Card Scanner 2 and LED indicators 114 (A & B) for indicating "power on", and for indicating card verification scan result "match" or "no match", respectively, plus a photo compartment, 122 for owners photo for ID security, user name and device ID number 127. The Caddy-Pilot for Kids 4 includes a USB 2 connector 44 to connect to any USB-equipped device with internet access (e.g., PC, PDA, and cell phone). The Caddy-Pilot for Kids 4 contains internal flash memory storage, and a programmable logic array (PLA) or processor for controlling communication with the Safe Card scanner 2 and transferring data through the Caddy-Pilot for Kids 4 communication strip and infrared processor. The user simply connects their Caddy-Pilot for Kids 4 to their USB-equipped device, inserts their Safe Card 2 into the Caddy, and places their finger over the biometric sensor on the Safe Card 2. Authentication is instantaneous since the Safe Card contains its own built-in biometric recognition system and The Caddy-Pilot for Kids 4 verifies Safe Card 2 by displaying a user's match with a green 114 LED. After user verification, all internet access is fully secured as described above.

It should now be apparent that the above-described method, system architecture, and peripheral components inclusive of a card scanner 2 and intelligent Caddy-Pilot for Kids 4 facilitates biometric-secure internet access for children without exposing any personal information, and provides parents with a high-confidence that their child's internet access is restricted in accordance with Safe Kid's Site and custom parental controls.

Having now fully set forth the preferred embodiments and certain modifications of the concept underlying the present invention, various other embodiments as well as certain variations and modifications of the embodiments herein shown and described will obviously occur to those skilled in the art upon becoming familiar with said underlying concept. It is to be understood, therefore, that the invention may be practiced otherwise than as specifically set forth in the appended claims.

I claim:

1. In regulating internet access by children by issuing a Safe Card to a child user, said Safe Card having an integrated fingerprint scanner, local memory with a Safe Card device ID and no initial user fingerprint scan data stored thereon, and a processing means for initiating and controlling a scanning operation when a child user places a finger on said fingerprint scanner to thereby obtain a real time fingerprint scan, by issuing a Card Caddy to said child user, said Card Caddy having an integrated USB port connector for connection to a computer, a dock for insertion of said Safe Card, and local memory with a Card Caddy device ID, and providing at least one web-enabled computer server maintained by an application service provider (ASP), said server including a first secure web portal for parental access and a second secure web portal for restricted online browsing by said child users, and a resident database, an improved method comprising the steps of:

pre-registering a child user by assigning a user ID to said child user, recording said user ID, said Safe Card device ID, and said Card Caddy device ID in said database, and storing said user ID in said local memory of said Safe Card;

storing in said database by said first secure web portal a ruleset restricting said child user's internet access;

activating said Safe Card by performing a first real-time fingerprint scan by receiving a finger of said child user on said fingerprint scanner, and storing a subset of said first real-time fingerprint scan in said local memory of said Safe Card;

receiving said Safe Card in said Card Caddy;

obtaining a second real-time fingerprint scan by said fingerprint scanner and initiating and controlling a scanning operation at said Safe Card;

determining a match of said first real-time fingerprint scan and said second real-time fingerprint scan by comparing by said processing means a subset of said second real-time fingerprint scan to said stored subset of said first real-time fingerprint scan;

based on said comparing step, transmitting said stored user ID and Safe Card device ID by said Safe Card to said Card Caddy;

transmitting said user ID, Safe Card device ID, and Card Caddy device ID by said Card Caddy to said web-enabled server;

comparing by said at least one web-enabled computer server said user ID, said Safe Card device ID, and said Card Caddy device ID transmitted by said Card Caddy to said user ID, Safe Card device ID, and Card Caddy device ID stored in said database during said pre-registration step; and based on said step of comparing said user ID, said Safe Card device ID, and said Card Caddy device ID transmitted by said Card Caddy to said user ID, Safe Card device ID, and Card Caddy device ID stored in said database, providing internet access by said computer through said second secure web portal according to said ruleset.

* * * * *